(12) United States Patent
Goedeken et al.

(10) Patent No.: US 6,660,311 B2
(45) Date of Patent: Dec. 9, 2003

(54) PRE-PROOFED FREEZER-TO-OVEN DOUGH COMPOSITIONS, AND METHODS

(75) Inventors: Douglas L. Goedeken, Blaine, MN (US); Dennis A. Lonergan, Medina, MN (US); RoseBud L. Sierzant, Minneapolis, MN (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 09/877,937

(22) Filed: Jun. 8, 2001

(65) Prior Publication Data

US 2003/0104100 A1 Jun. 5, 2003

(51) Int. Cl.[7] .............................. A21D 8/02; A21D 2/14
(52) U.S. Cl. ...................... 426/27; 426/498; 426/391; 426/549
(58) Field of Search ............................ 426/27, 549, 62, 426/128, 418, 524, 19, 391, 392, 498, 503, 551

(56) References Cited

U.S. PATENT DOCUMENTS

| 4,374,151 A | 2/1983 | Lindstrom et al. |
|---|---|---|
| 4,406,911 A | 9/1983 | Larson et al. |
| 4,450,177 A | 5/1984 | Larson et al. |
| 4,743,452 A | 5/1988 | Felske et al. |
| 4,839,178 A | 6/1989 | Seneau |
| 4,847,104 A | 7/1989 | Benjamin et al. |
| 4,929,464 A | 5/1990 | Willyard et al. |
| 4,966,778 A | 10/1990 | Benjamin et al. |
| 5,094,859 A | 3/1992 | Sluimer |
| 5,171,590 A | 12/1992 | Sluimer |
| 5,254,351 A | 10/1993 | de Boer et al. |
| 5,447,738 A | 9/1995 | de Bruijne et al. |
| 5,451,417 A | 9/1995 | Freyn et al. |
| 5,554,403 A | 9/1996 | Nakamura et al. |
| 5,560,946 A | 10/1996 | Sanders et al. |
| 5,672,369 A | 9/1997 | Lonergan et al. |
| 5,804,233 A | 9/1998 | Lonergan et al. |

FOREIGN PATENT DOCUMENTS

EP     0 145 367     11/1984

*Primary Examiner*—Keith Hendricks
(74) *Attorney, Agent, or Firm*—Kagan Binder, PLLC

(57) ABSTRACT

Described are yeast-leavened freezer-to-oven dough compositions, and methods of preparing them, wherein preferred compositions include an amount of freezing point depressant to reduce freezing onset temperature but not to prevent ice formation altogether, and wherein the process for preparing the dough composition can include a resting step following mixing.

36 Claims, 7 Drawing Sheets

PRE-PROOFED FREEZER-TO-OVEN DOUGH COMPOSITIONS, AND METHODS

FIELD OF THE INVENTION

The invention relates to pre-proofed frozen dough compositions and related methods and products.

BACKGROUND

Commercial and consumer users of dough products appreciate the advantages associated with freezer-to-oven dough products. A freezer-to-oven (FTO) dough is one that can be stored at or below freezing (i.e., below about 32F.) and can be baked from the frozen state without thawing or proofing. Different varieties of FTO dough products exist, some being leavened with yeast and pre-proofed before frozen storage, and others being chemically leavened.

Some freezer-to-oven doughs use special ingredients such as added gluten, gums, and gelatin, or special processing, to provide stability and useful frozen storage properties to FTO doughs. See, e.g.,: U.S. Pat. No. 5,560,946 (using emulsifier and protein); U.S. Pat. No. 5,447,738 (using gums and gelatin); U.S. Pat. No. 5,254,351 (using gelatin optionally with gluten); U.S. Pat. No. 4,966,778 (using added protein); U.S. Pat. No. 4,406,911 (using hydrophilic colloids); U.S. Pat. No. 4,450,177 (using hydrophilic colloids, film-forming proteins, and surfactants). Other FTO dough compositions use modified-atmosphere packaging, which may include a sealed atmosphere containing a high concentration of carbon dioxide or nitrogen.

Further improvements in freezer-to-oven dough products are desirable in the baked products arts, including new compositions and methods of making FTO doughs. In particular, it is always desirable to eliminate, where possible, ingredients included in a dough composition primarily to allow the use of the dough composition in FTO applications, including ingredients such as added gluten, surfactants, hydrophilic colloids, etc., as mentioned above. Also desirable is the elimination of burdensome manufacturing and storage processes or steps such as those relating to modified-atmosphere packaging. It is also desirable to provide dough compositions with improved oven spring and improved storage stability.

SUMMARY OF THE INVENTION

The invention relates to methods and compositions in preparing yeast-leavened, freezer-to-oven dough products. The ability to manufacture high quality, economical, freezer-to-oven yeast leavened dough products has eluded the industry for years. The combination of the high quality and long shelf life of frozen dough, and the convenience of FTO products, makes this a very attractive technology for both food service and retail applications.

The invention specifically relates to the use of freezing point depressants to reduce the freezing onset temperature (FOT) of a pre-proofed dough composition. The amount of freezing point depressant used in a dough composition is optimized as being enough to reduce the freezing onset temperature by a desired amount, but on the other hand is not so much that ice formation is prevented altogether. Some reduction in freezing onset temperature is desirable because high ice content in a frozen dough composition can cause negative results including a noticed reduction in stability or BSV. The invention recognizes that there is a balance between reducing freezing point (i.e., FOT) and eliminating ice formation altogether, and that an optimum level of freezing point depressant will accomplish both. Stated differently, while it is known to be desirable to reduce the amount of ice formation in a frozen dough composition, it has been discovered that some reduced amount of ice, without completely eliminating ice formation, can result in useful benefits such as a relatively better baked specific volume, improved stability, or both. In theory, ice is believed to retain carbon dioxide in a dough composition at frozen storage temperatures, by acting as a barrier to at least slow the amount of carbon dioxide that escapes from the dough during frozen storage. Retaining carbon dioxide can allow the use of non-modified atmosphere packaging. Secondly, the solid ice is thought to act to support a frozen dough structurally, to prevent damage of the dough matrix during storage.

While other FTO dough compositions have adjusted freezing temperatures to avoid ice crystals, the present invention recognizes that ice crystal formation should not be minimized or prevented altogether, but that some ice crystal formation is beneficial, and better than no ice at all. Preferred dough compositions can exhibit a freezing onset temperature (as measured using a cryoscope) in the range from about +5 F. (Fahrenheit) to about 20 F.

The formation of ice crystals can be controlled using ingredients that reduce the freezing onset temperature of the dough, e.g., to a freezing onset temperature that is reduced, but that does not prevent formation of ice altogether, during frozen storage. Freezing temperature depressants include salts, sugars, alcohols, and polyols, such as mono- or di-saccharides including dextrose, sucrose, fructose, as well as alcohols and polyols such as ethanol and glycerine. The inventive dough compositions can be prepared using various dough making techniques, and in one embodiment can be prepared with a rest step after mixing and prior to further processing such as sheeting or dividing and rounding. The dough compositions of the invention can also be packaged in packaging materials that do not include provisions for maintaining the dough composition in a modified atmosphere. Thus, embodiments of the dough compositions do not require modified atmosphere packaging, and can still exhibit useful or improved baked specific volume and stability properties.

Pre-proofed dough compositions will not require a proofing step between frozen storage and baking.

Also, in contrast to some other freezer-to-oven dough compositions, the inventive dough compositions do not require a high concentration of gluten, e.g., vital wheat gluten or any other source of concentrated wheat gluten. Nor do they require inclusion of special surfactants, emulsifiers, or hydrophilic colloids, like some other FTO dough compositions. The inventive dough compositions do not require special ingredients, processing, or packaging, making them both economical and practical. The invention could be applied to a broad range of dough products, ranging from sweet rolls to bread doughs to any other yeast-leavened finished dough products ranging from breads (pan bread, baguettes, dinner rolls), pizza crust, and sweet rolls, donuts, or pastries, etc.

An aspect of the invention relates to a method of preparing a yeast-leavened, pre-proofed dough composition. The method includes providing a dough composition comprising flour, yeast, water, and an amount of freezing point depressant that depresses the freezing onset temperature of the dough composition but allows ice formation in the dough composition at a frozen storage temperature; resting the dough composition to allow bubbles in the dough composition to enlarge in size; processing the dough composition; proofing the dough composition; and freezing the dough composition; wherein the dough composition can be baked to have a relatively greater baked specific volume compared to the same baked dough composition prepared without the resting step.

Another aspect of the invention relates to a method of preparing a yeast-leavened, pre-proofed dough composition. The method includes mixing a dough composition from ingredients comprising flour, yeast, water, and an amount of freezing point depressant that depresses the freezing onset temperature of the dough composition but that results in some ice formation in the dough composition at a frozen storage temperature wherein the ice retains carbon dioxide in the dough composition; proofing the dough composition; packaging the dough composition in non-modified atmosphere packaging; and freezing the dough composition.

Still another aspect of the invention relates to a method of preparing a yeast-leavened, pre-proofed dough composition. The method includes mixing ingredients into a dough composition comprising flour, yeast, water, and an amount of freezing point depressant that reduces the amount of ice formed during frozen storage but that still results in some ice formation to retain carbon dioxide in the dough composition during frozen storage; resting the dough composition for at least five minutes to allow bubbles in the dough composition to enlarge in size; processing the dough composition after resting; proofing the dough composition; freezing the proofed dough composition; packaging the proofed dough composition using non-modified atmosphere packaging; and baking the dough composition without proofing or thawing.

Still another aspect of the invention relates to a pre-proofed dough composition. The dough composition includes flour, yeast, water, and an amount of freezing point depressant to provide an freezing onset temperature in the range from about 10 to about 20 F., packaged in non-modified atmosphere packaging, wherein the pre-proofed dough can be baked from frozen without thawing or proofing to produce a baked dough composition having a relatively greater baked specific volume compared to a similar dough composition having a freezing onset temperature that is either below 10 F. or that is greater than 20 F.

DETAILED DESCRIPTION

Dough Composition

Figure 1:
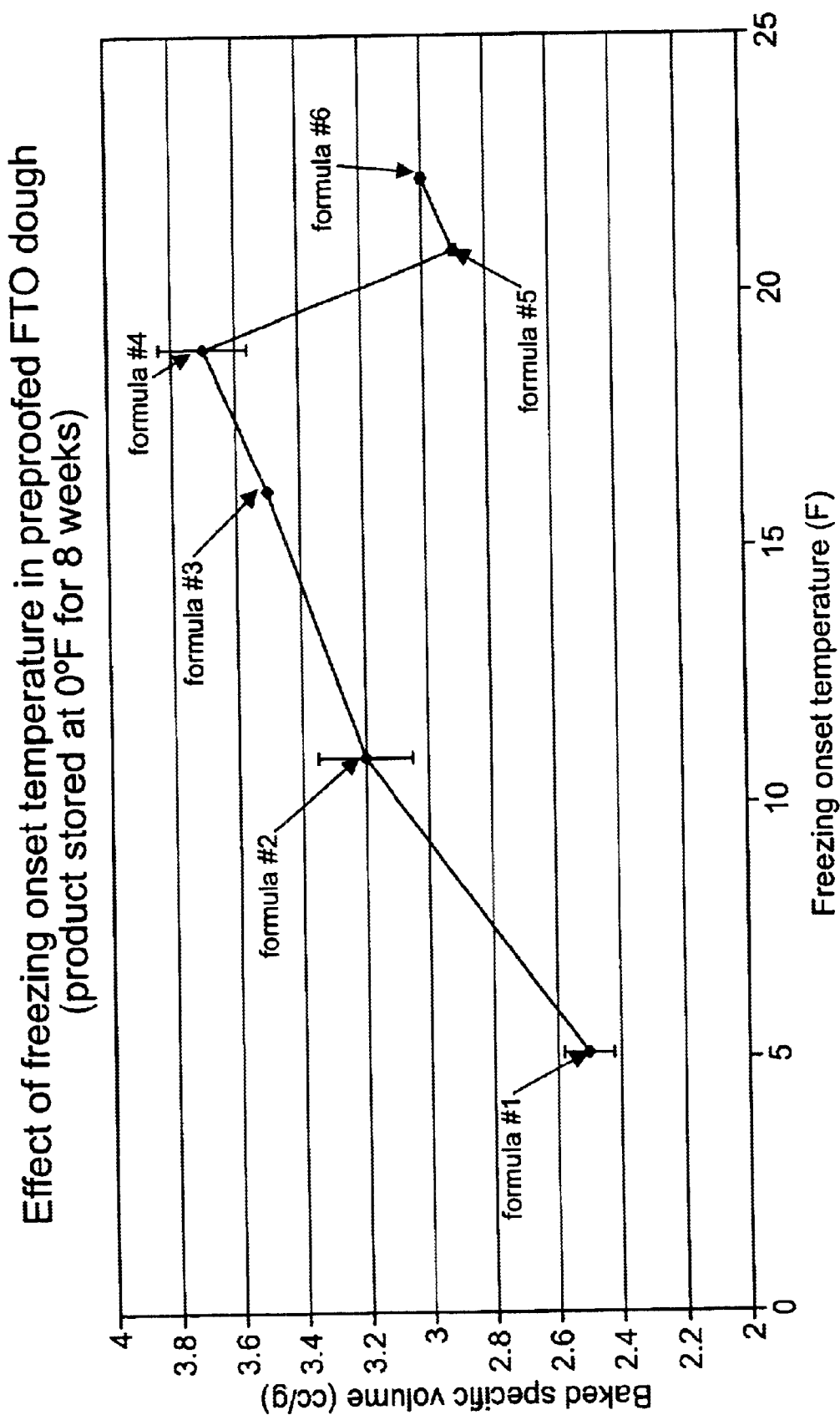
FIG. 1 is a graph of baked specific volume versus freezing onset temperature of dough compositions.

Dough compositions of the present invention can be formed in any suitable manner including methods generally understood and referred to as the sponge method, the straight-dough method, or the continuous dough method, all known in the dough composition arts. The particular formula for the dough will be dictated by the resulting end product. The dough composition can range anywhere from a bread to pastry, or otherwise. Breads have fat contents of 0% fat to about 6% fat and pastries generally have a fat content of 6% to about 30% by weight of the dough.

The dough composition can be prepared from ingredients generally known in the dough composition or bread or pastry-making arts, typically minimally including flour, a liquid component, and a leavening agent, and optionally including such additional ingredients as fat components, salt, sweeteners, dairy products, egg products, processing aids, emulsifiers, particulates, added flavorings, and the like.

According to the invention, dough compositions include a freezing point depressant to reduce the freezing onset temperature of the dough composition. Many freezing point depressants are known and understood in the food products arts. These food ingredients are sometimes referred to by other terms such as "water-activity reducing agents." Examples of freezing point depressants include salts such as sodium chloride salt; sugars including mono- and di- saccharides such as dextrose, glucose, fructose, etc.; alcohols and polyols, especially ethanol and low molecular weight polyols such as glycerine, mannitol, sorbitol, xylitol, and the like.

According to the invention, one or more freezing point depressant (if more than one is used they are referred to collectively as the freezing point depressant) is included in the dough composition in an amount that will reduce the freezing onset temperature, but also in an amount that will not completely prevent ice from forming in the dough composition during frozen storage. The term "frozen storage" refers to storage of a dough composition at a sub-freezing (i.e., below 32 F.) temperature generally useful and used for storing frozen dough compositions. Typical temperatures are in the range from about −20 F. to 32 F., with the range from about −10 F. to about 10 F. being preferred, and the range from about −10 F. to about 0 F. being particularly preferred.

While ice during storage has been found to be capable of negatively affecting dough properties such as baked specific volume and stability, it has been discovered that some ice can be useful in a pre-proofed frozen dough composition. For one thing, ice crystals can assist in retaining carbon dioxide in a frozen dough composition by acting as a barrier that prevents carbon dioxide from migrating from the frozen dough composition. Ice does not absorb carbon dioxide well, and therefore ice in a dough composition traps carbon dioxide in the interior of the composition, acting as a barrier and slowing or preventing the flow of carbon dioxide from the frozen dough composition. Water, in contrast, absorbs carbon dioxide well, allowing carbon dioxide to diffuse from the interior of a "frozen" dough composition and escape. A second useful function of ice in a frozen dough composition is that solid ice can act to provide support to a frozen dough composition matrix, which also adds to stability properties.

FIG. 1 shows how specific volume of a baked dough composition, when considered versus freezing onset temperature, includes a performance maxima at intermediate freezing onset temperatures. (The data point of the 5.1 F FOT includes about 4 weight percent glycerol and about 7 percent sugar, and data points with higher FOTs include less sugar and less glycerol.) The invention recognizes that when freezing point depressants are used, it can be advantageous to use enough to reduce the freezing onset temperature somewhat, to reduce the formation of ice crystals, but not to use too much, for instance so much that no ice will form at all under normal frozen storage temperatures.

As used herein, the term "freezing onset temperature" or FOT means the highest temperature at which ice can exist in equilibrium with water in dough. FOT is synonymous with the term "initial freezing point." Freezing onset temperature can be measured by known methods, including the one described below.

The amount of freezing point depressant useful in any particular dough composition will depend significantly on the particular dough composition being prepared. FIG. 1 shows an exemplary range of FOT for one embodiment of a dough composition, being from about 5 F. to about 20 or 22 F., with a preferred range being from about 10 to about 20 F., and an optimum FOT being about 19 F. Other ranges and optimums will be apparent with other dough compositions.

The amount of freezing point depressant useful to achieve a FOT of a particular composition will depend on the type of dough composition, the particular ingredients used in the dough composition, and the identity of the freezing point depressant. For instance, a salt as a freezing point depressant such as NaCl, can normally be used in amounts from about 0.7 to about 1.2 percent by weight based on the weight of the entire dough composition. Salts change sensory properties more quickly than they alter freezing point, so salts are not generally useful in largely modifying a FOT. Other types of freezing point depressants such as alcohol, polyols, and sugars, can be used in larger ranges of amounts, and therefore can be preferred in affecting FOT. Relatively lower molecular weight freezing point depressants can sometimes be preferred because freezing point depressants are understood to affect FOT based on osmolality of the freezing point depressant.

Figure 7:
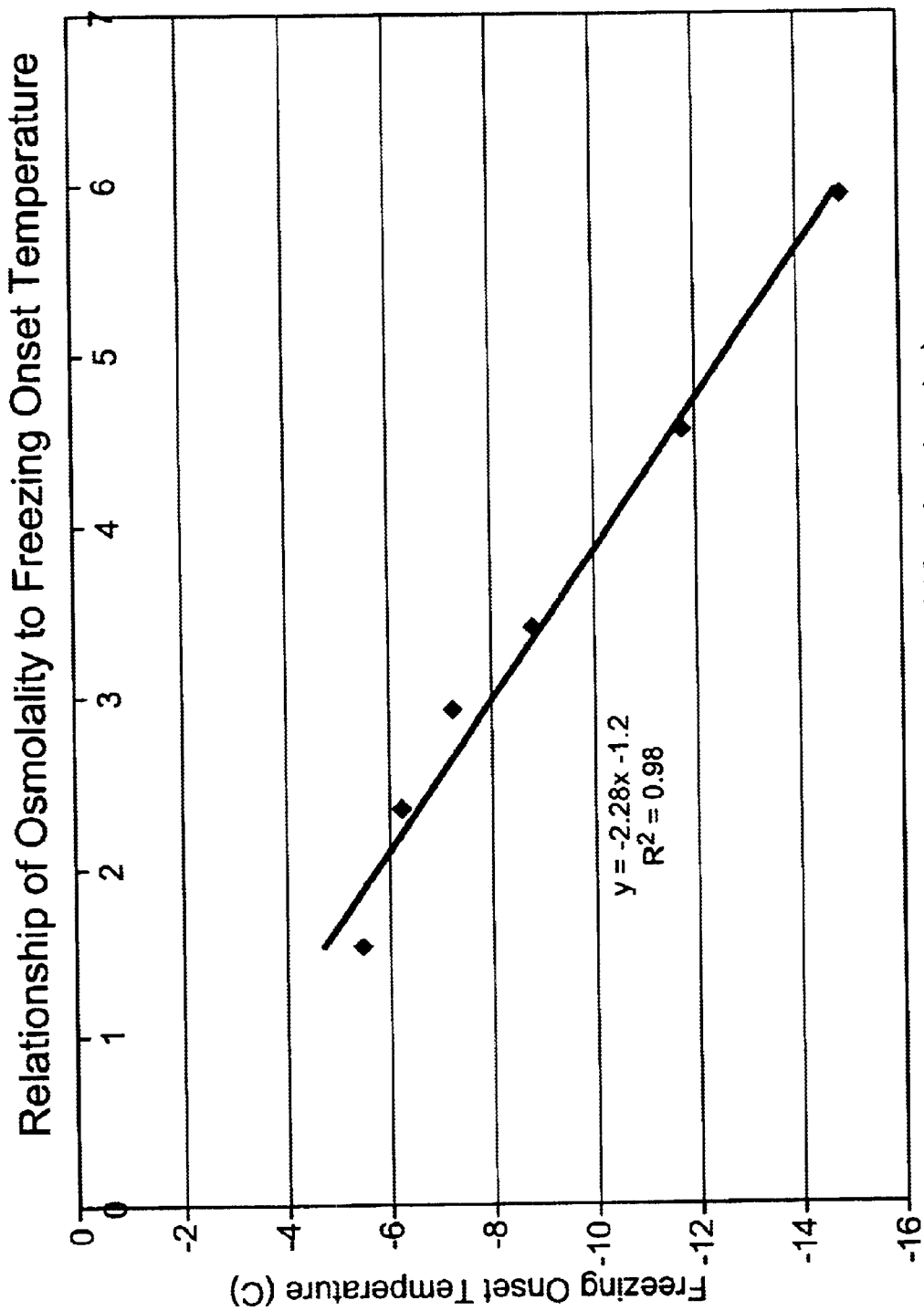
FIG. 7 illustrates a graph of calculated osmolality of freezing point depressants in a dough composition versus freezing onset temperature.

More specifically, relatively lower molecular weight freezing point depressants can sometimes be preferred because freezing point depression is based on the number of molecules in solution rather than their weight percentage. In an ideal solution, the FOT is reduced by about 1.86 degrees Celsius in a one Osmolal solution. Osmolality is the number of equivalents per Kg of solvent water. In dough, not all of the water is available to act as solvent water. Solvent water is total water minus that water that is so tightly associated with the dough composition that it does not act as solvent water. We have estimated solvent water as being the total amount of water in the dough minus 0.3 grams of water per gram of flour. This assumption was used to calculate the Osmolality of the doughs in FIG. 7 and in Table 1. FIG. 7 shows a relationship between Osmolality to FOT and that the FOT can be predicted ($R_2$=0.96) quite well by calculating the Osmolality of the dough. The equations are:

$$FOT(C) = (-2.3 \times Osmolality) - 1.2.$$

In a general sense, the preferred Osmolal concentration of freezing point depressants in a dough can be in the range from about 2 to 5 equivalents per Kg solvent water, with the range from about 3 to 4 equivalents per Kg solvent water being the preferred range.

Table 1 shows examples of dough formulas and Osmolality values.

TABLE 1

| Flour | Water | Fructose | HFCS | Dextrose | Sucrose | Ethanol | Glycerol | Osmolality | FOT (C.) | FOT (F.) |
|---|---|---|---|---|---|---|---|---|---|---|
| 52.9 | 25.7 | 0 | 0 | 0 | 7 | 0 | 0 | 3.41 | −9.0 | 15.8 |
| 52.8 | 22.8 | 0 | 10 | 0 | 0 | 0 | 0 | 3.35 | −8.8 | 16.1 |
| 51.9 | 23.7 | 0 | 5 | 0 | 5 | 0 | 0 | 3.81 | −9.9 | 14.2 |
| 53.2 | 25.9 | 0 | 0 | 0 | 5 | 1.5 | 0 | 4.27 | −11.0 | 12.3 |
| 55.0 | 24.1 | 0 | 5 | 0 | 0 | 0 | 1.5 | 3.27 | −8.7 | 16.4 |
| 51.9 | 23.7 | 0 | 5 | 5 | 0 | 0 | 0 | 3.75 | −9.8 | 14.4 |
| 54.4 | 24.2 | 0 | 5 | 0 | 0 | 1 | 1 | 3.94 | −10.2 | 12.6 |
| 52.2 | 25.4 | 8 | 0 | 0 | 0 | 0 | 0 | 3.59 | −9.4 | 15.1 |
| 53.5 | 24.6 | 0 | 0 | 6 | 0 | 0 | 1.5 | 3.98 | −10.3 | 13.5 |
| 51.3 | 21.8 | 0 | 5 | 6 | 0 | 0 | 1.5 | 5.08 | −12.8 | 8.5 |

All formulas also contain 5% Fresh Eggs, 3% Shortening, 2% NFDM, 1% salt, and 0.4% dough conditioner.

In terms of particular freezing point depressants, individual freezing point depressants and combinations of two or more freezing point depressants can be included in a dough composition in any amount that provides the desired effect on freezing onset temperature. Examples of some useful and preferred ranges are:

| Ingredient | Useful Range | Preferred Range |
|---|---|---|
| Sucrose | 0–10 wt % | 3–8 wt % |
| Glycerol | 0–4 | 0–2 |
| Ethanol | 0–3 | 0–2 |
| Dextrose | 0–10 | 0–6 |
| High Fructose Corn Syrup | 0–16 | 0–12 |
| NFDM | 0–4 | 0–2 |
| Salt | 0.5–1.5 | 0.75–1.25 |

Combinations of these ingredients can be used together in the identified ranges. Some examples of useful combinations include an alcohol or polyol (e.g., ethanol or glycerine) and a sugar (e.g., sucrose). As stated, other amounts of freezing point depressants and other combinations of different specific freezing point depressants will also be useful. Embodiments of dough compositions may include, for example, a combination of sucrose and ethanol, e.g., from about 7 to 3.5 weight percent sucrose in combination with from about 0 to 1.5 weight percent ethyl alcohol. Other embodiments may include combinations of sucrose and glycerine, e.g., from about 3 to about 8 weight percent sucrose and from about 0 to about 2 weight percent glycerine.

Generally, dough compositions of the invention can include flour in an amount in a range of between about 30 wt % and about 70 wt % by weight of the dough, water in an amount of between about 30 wt % and about 40 wt % by weight of dough, sugar in an amount in a range of between 2 wt % and about 15 wt %. Other dry minor ingredients, such as dough conditioners and salt may be present.

The flour component can be any suitable flour or combination of flours, including glutenous flour or a combination of glutenous and nonglutenous flours, and combinations thereof. The flour or flours can be whole grain flour, flour with the bran and/or germ removed, or combinations thereof. Unlike some other FTO dough compositions, the compositions of the invention do not require an increased protein concentration. The inventive dough compositions can be prepared to have a gluten content of no greater than 16 weight percent or preferably no more than 13 weight percent gluten, based on the total weight of flour (i.e., less than 16 or 13 parts by weight gluten per 100 parts by weight flour). Dough compositions can include these amounts of gluten without the need for very high protein flour or concentrated gluten ingredients such as vital wheat gluten. Typical dough compositions can include between about 45% to about 60% by weight flour, such as from about 50 to 55 weight percent flour.

The dough composition can also include one or more liquid components. Examples of liquid components include water, milk, eggs, and oil, or any combination of these. Preferably, the liquid component includes water, e.g., in an amount in the range from about 15 to 35 weight percent, although amounts outside of this range may also be useful. Water may be added during processing in the form of ice, to control the dough temperature in process; the amount of any such water used is included in the amount of liquid components. The amount of liquid components included in any particular dough composition can depend on a variety of factors including the desired moisture content of the dough composition. Typically, liquids can be present in a dough composition in an amount between about 15% by weight and about 35% by weight, e.g., between about 20% by weight and about 30% by weight.

The dough composition can optionally include an egg product, e.g., for flavoring. Examples of egg products include fresh eggs, egg substitutes, dried egg products, frozen egg products, etc. The amount of egg products, if used, can be between about 0.1 percent by weight and about 35 percent by weight. The egg products may be in a dried form or a liquid form. If a liquid form of egg product is used, the amount of liquid component is adjusted to take into account the moisture content resulting from the liquid egg product.

The dough composition can optionally include dairy products such as milk, buttermilk, or other milk products, in either dried or liquid forms. Alternatively, milk substitutes such as soy milk may be used. If used, dairy products can be included as up to about 25 percent by weight of the dough composition, e.g., between about 1 percent and about 10 percent of the dough composition. If a dried dairy product is used, it is not considered to be a part of the liquid component identified above; if a liquid form of a dairy product is used, the amount of other liquid components, if any, can be adjusted accordingly.

The dough composition can optionally include fat ingredients such as oils and shortenings. Examples of suitable oils include soybean oil, corn oil, canola oil, sunflower oil, and other vegetable oils. Examples of suitable shortenings include animal fats and hydrogenated vegetable oils.

If included, the amount of fat included will depend in large part on the particular type of dough composition being prepared, i.e., a bread, a bagel, or a donut, roll, or other pastry. Fat can typically be used in amounts less than about 20 percent by weight, often less than 10 percent by weight of a dough composition. If liquid oils are used as a fat, the amount of other liquid components can be adjusted accordingly. One of ordinary skill will recognize that the chosen amounts and types of fats included can be adjusted depending on the desired texture of the dough product.

The dough composition can optionally include one or more sweeteners, either natural or artificial, liquid or dry. If a liquid sweetener is used, the amount of other liquid components can be adjusted accordingly. Also, sugar sweeteners act as freezing point depressants, so the amount of a sugar used as a sweetener is adjusted or included in the amount of sugar added as a freezing point depressant, and vice-versa. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include between about 2% by weight and about 15% by weight, e.g., from about 5% by weight to about 10% by weight sweetener.

The dough composition can further include additional flavorings, for example, salt, such as sodium chloride and/or potassium chloride; whey; malt; yeast extract; inactivated yeast; spices; vanilla; natural and artificial flavors; etc.; as is known in the dough product arts. The additional flavoring can typically be included in an amount in the range from about 0.1 percent to about 10 percent of the dough composition, e.g., from about 0.2 percent to about 5 percent of the dough composition.

The dough composition can optionally include particulates such as raisins, currants, fruit pieces, nuts, seeds, vegetable pieces, and the like, in suitable amounts.

As is known, dough compositions can also optionally include other additives, colorings, and processing aids such as emulsifiers include lecithin, mono- and diglycerides, polyglycerol esters, and the like, e.g., diacetylated tartaric esters of monoglyceride (DATEM) and sodium stearoyl-2-lactylate (SSL).

Conditioners, as are known in the dough products art, can be used to make the dough composition tougher, drier, and/or easier to manipulate. Examples of suitable conditioners can include azodicarbonamide, potassium sulfate, L-cysteine, sodium bisulfate and the like. If used, azodicarbonamide is preferably not present in an amount more than 45 parts per million.

The dough contains a yeast leavener in a useful amount, but, depending on the type of dough product desired, may additionally contain some amount of a chemical leavener that produces carbon dioxide by a reaction between, for example, sodium bicarbonate and glucono-delta-lactone.

Preparation of Dough Composition

To produce a dough product, a dough composition (raw) is first produced. This can be accomplished according to methods and steps that are known in the dough and dough product arts, for example according to one or more of the following steps, not to the exclusion of other steps, and not necessarily in the recited order.

Yeast

Yeast can be included in the dough composition as fresh yeast (cream or compressed), or from a dried yeast that is re-hydrated. Either type may be acceptable, and either may be chosen for reasons of convenience or cost.

To prepare a dried yeast leavening agent for use, an active yeast composition can be hydrated to form a yeast slurry that can be incorporated into the flour. This will be known and understood by a skilled artisan. In a yeast slurry, the yeast is typically substantially dispersed without any desirable lumps. The yeast slurry can be mixed, tumbled, or agitated in a suitable manner to prevent the yeast from settling to the bottom.

Mixing

Generally, the flour and any other dry ingredients can be combined with the fat component, if used, and then combined with a yeast slurry (if a dry yeast is used) or with a pre-hydrated yeast. All ingredients are generally mixed together, using any of a variety of methods and/or addition orders as are known in the dough-making arts, to form a raw dough composition.

Mixing may be performed in commercially available and well-known equipment, for example a horizontal bar mixer with a cooling jacket (e.g., a 2500 lb. horizontal bar mixer from Oshikiri in Japan). The dough composition is generally mixed between about 5 minutes and about 15 minutes, or until a proper consistency is achieved. The target temperature for the resulting dough composition is generally between about 50° F. and about 80° F. (this can be controlled at least in part by the use of ice). A farinograph and extensigraph can optionally be used to verify the flour/water ratio and dough composition development, as well as the physical and mechanical properties of the dough composition generally.

Resting

According to the invention, a dough composition, after mixing, can be rested.

Because dough compositions are viscoelastic materials, known processes for making dough compositions sometimes include a rest step after mixing or after later processing, to allow a dough composition to relax. Relaxing the dough by resting is thought to improve the machineability of the dough and facilitate a next step in processing such as sheeting or dividing and rounding, or other processing.

Figure 2:
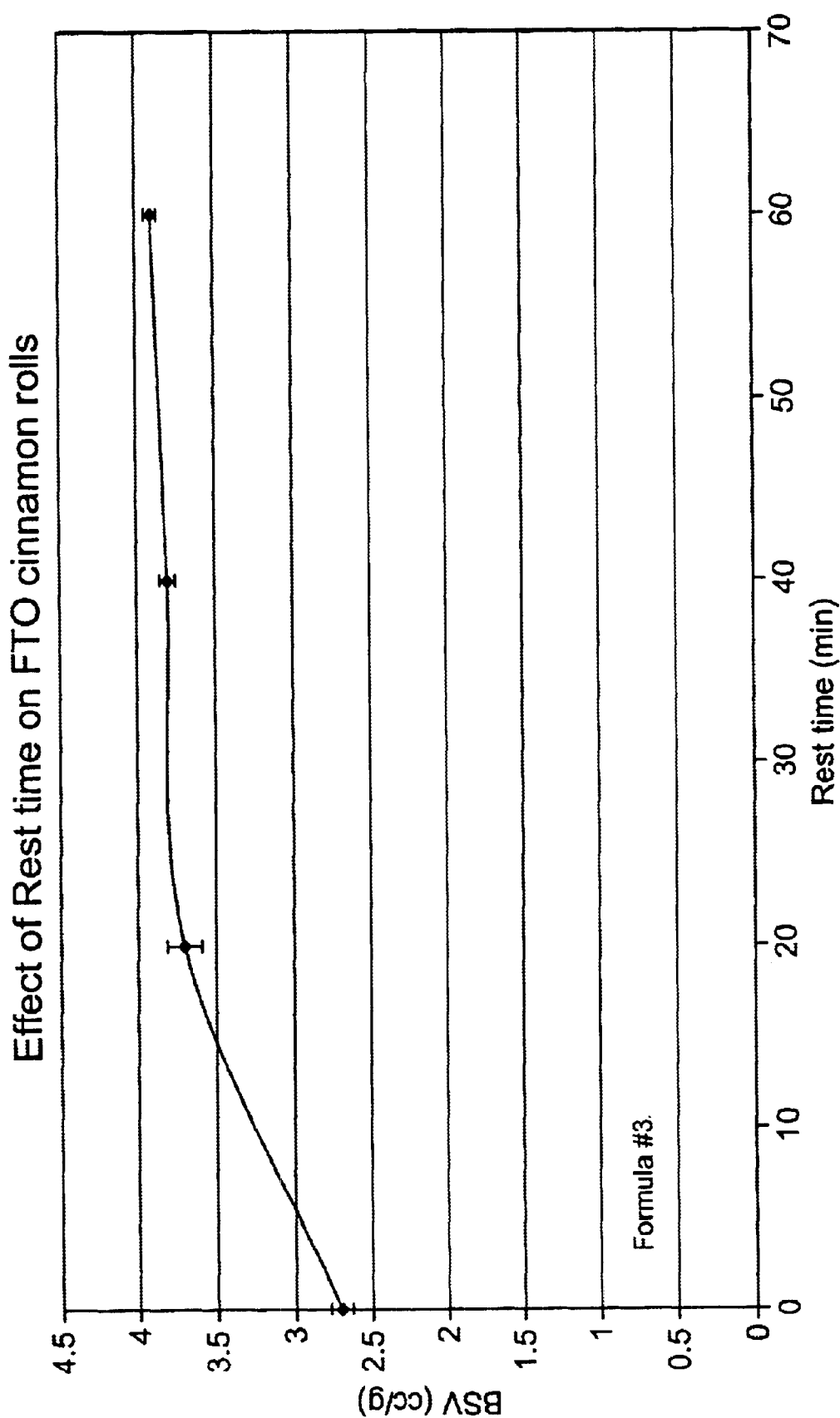
FIG. 2 is a graph of specific volume of dough compositions versus rest time after mixing.

A resting step can preferably be performed according to methods of the invention, to enlarge the size of bubbles in the dough composition after mixing. A dough composition immediately after mixing will normally have a raw specific volume of less than 1 cubic centimeter per gram (cc/g), generally about or below about 0.9 cc/g. A resting step according to the invention is practiced to allow yeast to ferment and produce gas, which expands bubbles (cells) of the dough matrix. The rest step can take any amount of time to give a desired size of bubble, and can preferably be performed for from about 5 to about 30 minutes, e.g., from about 10 to about 20 minutes. Longer times may also be used, but there may be no additional benefit after 20 or 30 minutes. Alternately considered, the rest step can be sufficiently long to result in a rested dough composition having a raw specific volume of greater than 1 cc/g, preferably from about 1 cc/g up to about 1.2 cc/g. FIG. 2 shows a graph of baked specific volume of a dough composition of the invention versus rest time after mixing and before further processing.

After resting, when further processed, e.g., sheeted, bubbles of the dough composition will be relatively larger than if there were no rest step. Put simply, the resting step produces a dough composition which after processing (e.g., sheeting or dividing, etc.) will have a dough matrix that contains a relatively smaller number of bubbles or cells that are of a relatively larger size, as compared to a matrix of an unrested and processed dough composition that includes a relatively larger number of relatively smaller cells. This is true even though the two processed compositions can have approximately the same density. A later result of the resting step can be an improvement in oven performance of the dough composition in the form of oven spring, as measured by baked specific volume. As a theory, it is believed that improved oven spring can occur because relatively larger bubbles are inherently easier to expand compared to relatively smaller bubbles, so a dough composition containing a smaller number of larger bubbles will expand more easily than the same composition containing a larger number of smaller bubbles, thus resulting in a greater baked specific volume.

Figure 3A:
FIGS. 3a through 3d are photographs of sample dough compositions.
Figure 3B:
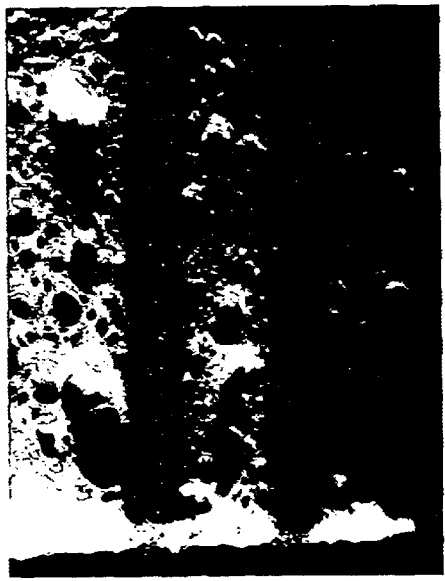
Figure 3C:
Figure 3D:
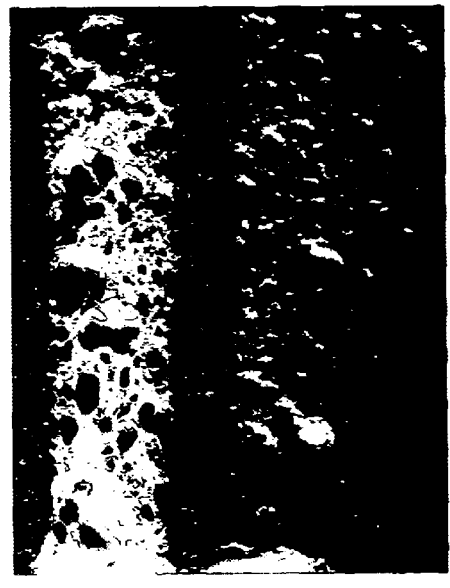

FIGS. 3a, 3b, 3c, and 3d, show a comparison between baked dough compositions (cinnamon rolls) processed using a rest step (20 minute floor time, FIGS. 3c, center and 3d, edge) and processed with no rest step (0 minute floor time, FIGS. 3a, center and 3b, edge). The figures show that the samples of 3c and 3d, processed with 20 minutes floor time, have larger bubbles.

Processing

Once the dough composition has been prepared, it can be further processed according to known methods of forming a dough composition into a desired size and shape (followed by other processing steps such as proofing, packaging, freezing, and cooking). A variety of techniques can be used for processing, as are known. For example, processing of the dough composition can include one or more of sheeting, extruding, dividing and rounding, and the like; cutting to a desired size and shape; folding; filling; and cooking. According to the invention, any processing can be useful, including any one or more of those identified directly above. Preferred processing techniques after resting can include sheeting, dividing and rounding, or any other technique that results in a rested, processed dough composition that contains relatively smaller amount of bubbles that are a relatively larger size as compared to a dough that was similarly processed but without being rested.

The sheeted or divided and rounded dough composition can be assembled into any of a variety of shapes and products, as desired. Methods and equipment for shaping, sizing, or otherwise cutting sheeted dough compositions are well known.

The size and shape of the product may depend on the type of dough product being prepared, as well as other factors such as the dough composition, e.g., whether it is light and/or sweet like a donut or heavy like a pretzel or bagel, whether or not it is intended to be heated (e.g., in a toaster), etc.

In one preferred embodiment of the invention, the dough product can be cut and rolled into the form of a cinnamon roll, which can be formed by cutting a strip of dough composition, adding cinnamon to a surface, and rolling from an end.

Methods of shaping and sizing a dough product, including steps of sheeting, cutting, folding, perforating, crimping, and otherwise assembling, are well known, and are described, for example, in Assignee's copending U.S. patent application Ser. No. 09/432,446, filed Nov. 3, 1999, incorporated herein by reference.

Proofing

The dough composition can be proofed, generally after sheeting or otherwise forming and assembling the dough composition into a desired product size and shape. Proofing can be accomplished by providing conditions under which fermentation of the yeast will occur. Proofing a yeast-leavened dough composition results in desired organoleptic properties, for example smell and flavor, after baking. During proofing, the dough composition expands in volume, i.e., the dough composition becomes less dense, due to fermentation of sugars by the yeast to produce gaseous carbon dioxide. Other substances produced during fermentation modify the elasticity, stickiness, and the flow properties of the dough composition.

Proofing equipment generally includes a warming unit that is enclosed with humidification and air flow. Proofing can be performed in a variety of proofing units. Suitable proofing units are supplied, for example, by Frigoscandia Equipment, Redmond, Wash.; Northfield Freezing, Northfield, Minn.; and Triphase, West Yorkshire, U.K.

Proofing is conducted until the proper degree of proofing is obtained, which can be measured by the volumetric rise of the dough. Generally, this volumetric rise is in a range to achieve a raw specific volume of about 1.5 to about 3, preferably, between about 1.5 to about 2.75, and most preferably from between about 1.75 and about 2.5.

While timing and conditions outside of the following range can also be useful, proofing can typically be performed at a temperature between about 80° F. and about 115° F., preferably the proofing is performed between about 85° F. and about 110° F., and more preferably between about 90° F. and about 105° F. Proofing can be performed at a relative humidity between about 40% and 95%, preferably between about 45% and about 85% and more preferably between about 50% and about 60%. Proofing is generally performed for between about 20 minutes to about 90 minutes, preferably between about 20 minutes to about 80 minutes and more preferably for between about 40 minutes and about 60 minutes.

Packaging and Storage

The proofed pieces of dough are cooled (this can be done optionally either before or after other steps such as packaging) to their appropriate storage temperature, and packaged in suitable packaging. For frozen distribution, i.e., a temperature of less than 32 F. (0 C.), the preferred storage temperature is in the range of between about −20 F. and about 20 F. preferably in a range of between about −10 F. (−25 C.) and about 10 F. (−12 C.). Storage temperature may vary throughout storage time. It is preferred that these temperatures be maintained for at least a majority and preferably at least about 90% of the time the product is stored.

The dough composition can be packaged by any desired methods and using any desired packaging materials. The packaging need not be air tight, but can preferably be closed to prevent water loss. Unlike other FTO dough compositions, the composition need not be packaged to maintain the dough composition in a modified atmosphere such as an atmosphere that includes an artificially high concentration of one or more of nitrogen or carbon-dioxide compared to ambient atmospheric air, although such modified atmosphere packaging can be used if desired.

Baking

The cooking temperature is in the range of between about 325 F. (163 C.) and about 400 F. (205 C.) for baking and is in the range of between about 350 F. (175 C.) and about 400 F. (205 C.) for frying. The dough can be baked in any type of oven, such as conventional, convection, or impingement ovens.

Microwaving would also be a way of baking the dough composition. The product will perform well in terms of volume expansion in a microwave, and a "browning" solution could be applied to cause the surface to brown.

The baked dough compositions of preferred embodiments of the invention, e.g., including a resting step, can exhibit improved baked specific volume relative to dough compositions prepared without a resting step as described. Exemplary BSVs of baked dough compositions can be in the range from about 2.5 (cc/g) to at least 4 or more, preferably from about 3 to about 4 (cc/g).

Products

The invention can be applied to a broad range of dough products, ranging from sweet rolls to bread doughs to any other yeast-leavened finished dough products such as breads (pan bread, baguettes, dinner rolls), pizza crust, and sweet rolls, and other dough products.

Figure 5:
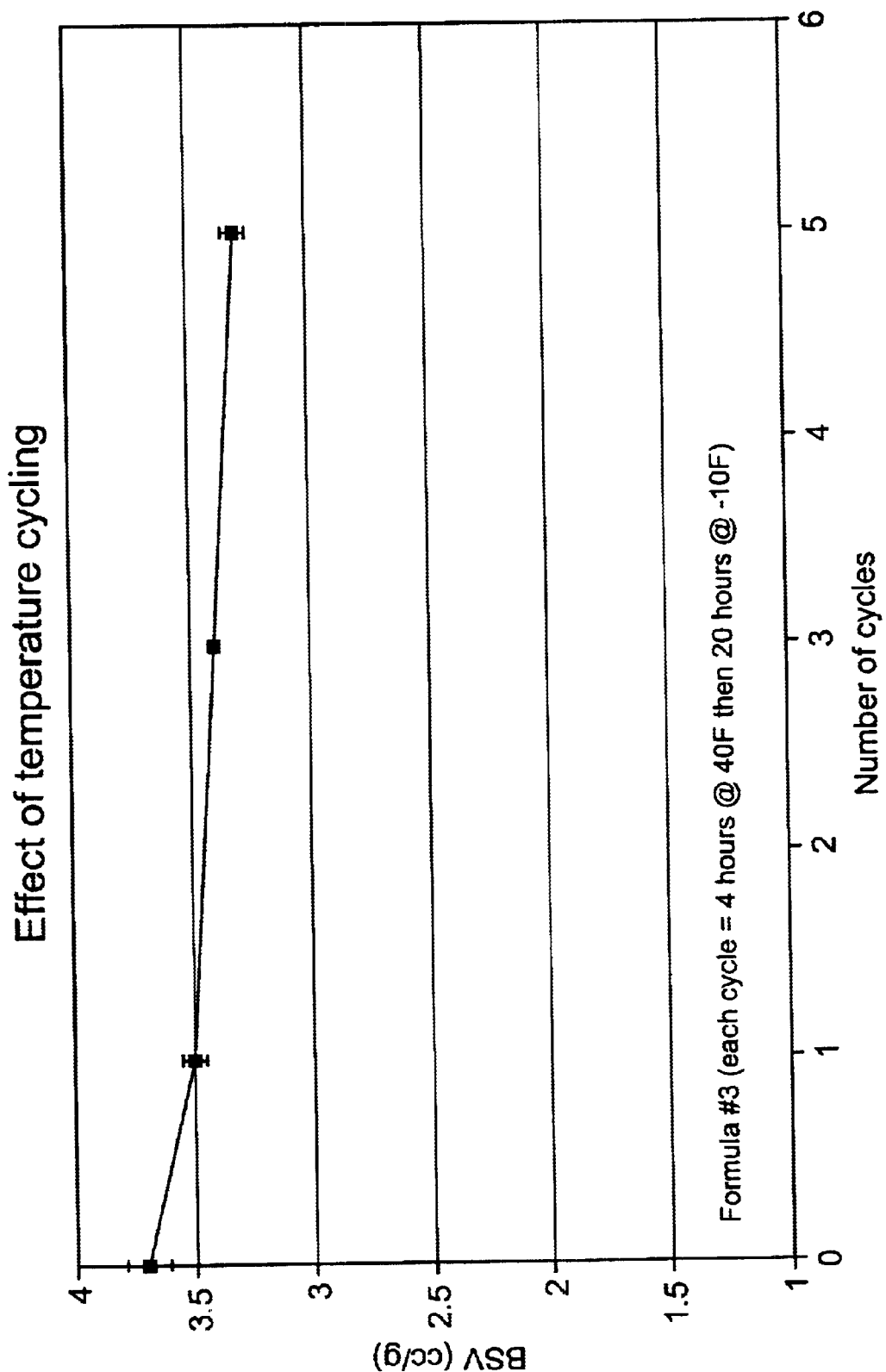
FIG. 5 illustrates a graph of baked specific volume versus freezing and thawing cycles.

This dough composition can be very stable, preferably able to maintain desirable oven spring (preferably expanding, e.g., from a raw specific volume (RSV) of 1.75 to 2.5 cc/g to a baked specific volume (BSV) of 3 to 4 cc/g) through at least 4 months frozen storage. Typical other preproofed frozen doughs may lose oven spring within the first week of frozen storage resulting in a very dense and undesirable finished product. Furthermore, dough compositions of the invention can exhibit improved stability through freezing and thawing cycles. Freezing and thawing testing is performed by cycling a dough composition through frozen and thawed conditions. The amount of time needed to freeze and thaw a composition will depend on the type and formulation of the dough composition (and the FOT), the size of the dough composition, and the freeze or thaw temperature. FIG. 5 shows that FTO cinnamon rolls of the invention suffer only minor reduction in baked specific volume after being frozen and thawed up to 5 times.

EXAMPLES

Method for measuring FOT:

The method used to measure FOT relies on the principle that all water-containing materials will go through a process of supercooling when they are frozen. This means that upon initial cooldown, the temperature will drop below the FOT before ice begins to form. Once ice nucleation is formed and freezing begins, the sample temperature will rapidly go back up and reach a peak, which we define as the FOT. As the sample is cooled further, more ice forms and the sample temperature will come to equilibrium with its surroundings.

The following equipment can be used:

a small test tube (3–4 ml capacity)

a refrigerated water bath capable of going down to −5 F. filled with antifreeze liquid such as propylene glycol, ethylene glycol, ethanol, isopropyl alcohol, etc.

a small diameter (0.8 mm) digital temperature probe with resolution of 0.1 F.

The following procedure was followed:

1) Weigh 2.0 g of room temperature dough and press into the bottom of the test tube ensuring minimal entrapment of air bubbles;

2) Insert the temperature probe so that it is positioned approximately in the center of the dough;

3) Immerse the test tube in the chilled bath so that the level of chilled liquid is above the height of the dough, taking care to ensure that the bath liquid does not spill over the top and get inside the tube. (The bath temperature should be set about 10° F. below the estimated FOT. If the bath is too warm, the temperature at which nucleation occurs may not be reached and ice will not form.);

4) Monitor the temperature in the dough and record peak temperature observed immediately after supercooling.

Since the FOT is not know initially, an iterative process needs to be followed where a best guess at FOT is made and the bath is set 10° F. lower, then a measurement is taken as described in step 4 and bath temperature is adjusted, and the process repeated as needed.

Figure 4:
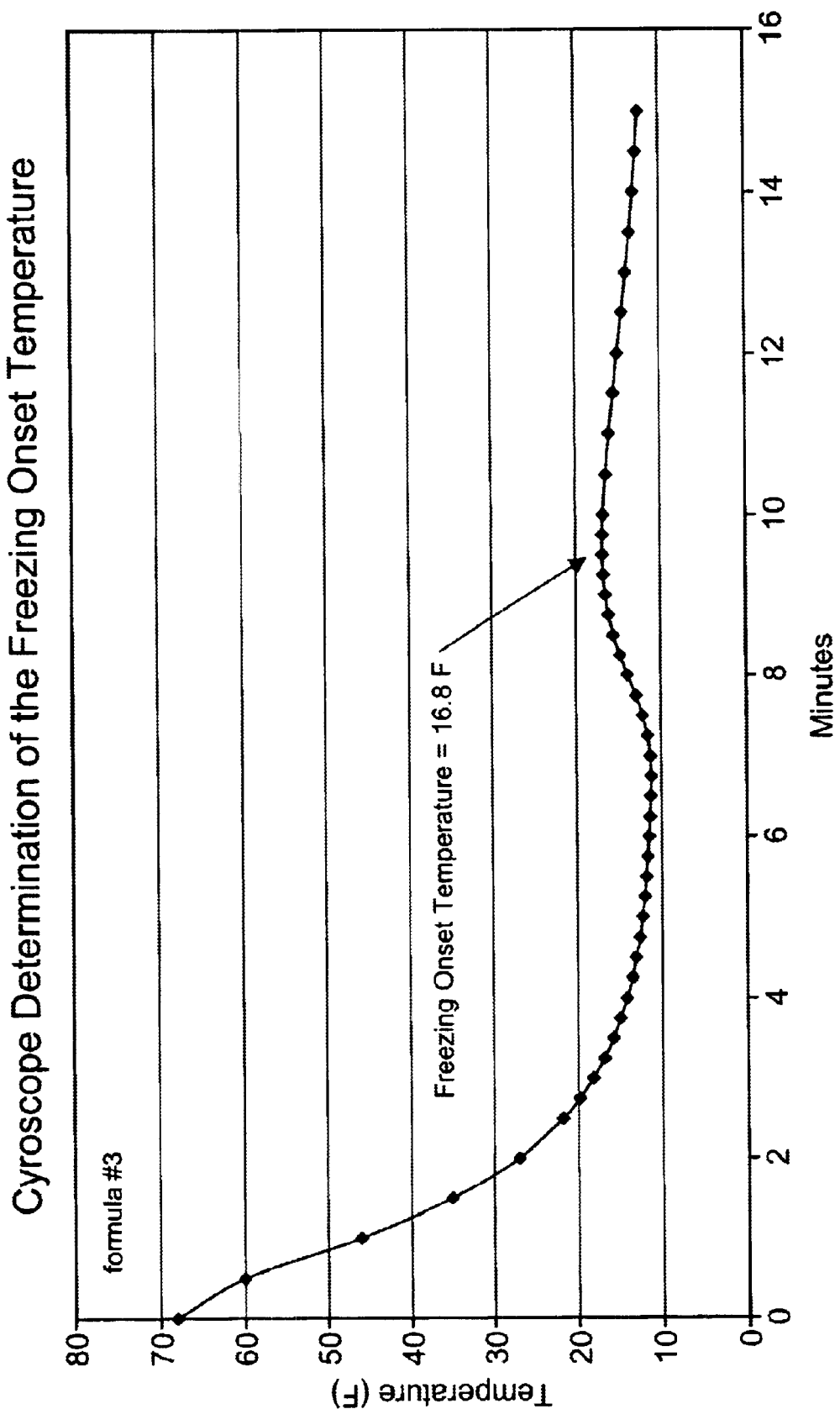
FIG. 4 is a temperature graph illustrating a method of measuring freezing onset temperature.

FIG. 4 illustrates a time temperature graph of a typical FOT measurement. In the figure, point A is initial dough temperature, point B is supercooled temperature where ice nucleation begins, and point C is the freezing onset temperature (FOT).

Formula 1
Cinnamon Rolls

| Ingredient | Batch Size: (wt %) | 15000 Grams (gr) |
|---|---|---|
| 1st Stage Ingredients | | |
| Flour - Hard, Malt, En | 51.83 | 7774.5 |
| NFDM - Hi Heat (Heat Treated non-fat dry milk) | 2.00 | 300.0 |
| Ascorbic Acid | 0.0100 | 1.5 |
| Azodicarbonamide | 0.0220 | 3.3 |
| DATEM (Diacetyl tartaric acid esters of mono and diglycerides | 0.1600 | 24.0 |
| Sodium Stearoyl Lactylate | 0.2000 | 30.0 |
| Sugar (Sucrose) | 3.50 | 525.0 |
| Margarine/Shortening | 3.00 | 450.0 |
| Water | 22.78 | 3417.0 (2278.1 is H$_2$O, 1138.9 is Ice) |
| Fresh Eggs | 5.00 | 750.0 |
| Compressed Yeast | 3.00 | 450.0 |
| Glycerol | 4.00 | 600.0 |
| 2nd Stage Ingredients | | |
| Sugar (Sucrose) | 3.50 | 525.0 |
| Salt | 1.00 | 150.0 |
| Total: | 100.00 | 15000.3 |

| | |
|---|---|
| Weigh Together: | 1) Dough Conditioner ingredients, NFDM, Sugar and Flour. 2) Sugar & Salt for 2nd Stage. |
| Weigh Separately: | Yeast--add to mixer in 1st Stage-30 sec mix. Margarine/Shortening Glycerol |
| Order of Ingreds: | Ice Water, Melted Marg, Glycerol, Dry ingredients, Yeast (during mixing). |
| Spiral Mixing: | 1st Stage: 30 sec slow, 7 min fast (420 sec) 2nd Stage: 30 sec slow, 3½ min fast (210 sec) 480 gr for Farinograph--BU's 1000 ± 50 Final dough temp 62–65 F. |
| Rest Time: | Allow the dough to rest for 30 min prior to sheeting. |
| Sheeting/Cutting: | Cut dough to 4700 gr portion. Use 2 Sheetings. Add 1032 gr filling Sheet dough to 9–10 mm. Do a 3-Fold. Final sheeting is to ≦4 mm and pad 18" wide Apply the pre-measured filling to entire pad. Roll tightly from the long end. Wet the end and pinch to seal. Target: 120 ± 5 gr. |
| Proofing: | Randomize pans btwn sheetings. Place 4 rolls to a pre-sprayed square pan. 1 pan into a square plastic bag. Proof to 2×, freeze overnight and then move to appropriate temp box. |

Formula 2 - Glycerol 2% - Prepared according to the procedure of Formula 1.
Cinnamon Rolls

| Ingredient | Batch Size (wt %) | 15000 Grams (gr) |
|---|---|---|
| 1st Stage Ingredients | | |
| Flour - Hard, Malt, En | 52.23 | 7834.5 |
| NFDM - Hi Heat | 2.00 | 300.0 |
| Ascorbic Acid | 0.0100 | 1.5 |
| Azodicarbonamide | 0.0220 | 3.3 |
| DATEM | 0.1600 | 24.0 |
| Sodium Stearoyl Lactylate | 0.2000 | 30.0 |
| Sugar (Sucrose) | 3.50 | 525.0 |
| Margarine/Shortening | 3.00 | 450.0 |
| Water | 24.38 | 3657.0 (2438.1 is H$_2$O, 1218.9 is Ice) |
| Fresh Eggs | 5.00 | 750.0 |
| Compressed Yeast | 3.00 | 450.0 |
| Glycerol | 2.00 | 300.0 |
| 2nd Stage Ingredients | | |
| Sugar (Sucrose) | 3.50 | 525.0 |
| Salt | 1.00 | 150.0 |
| Total: | 100.00 | 15000.3 |

Formula 3 - 7.0% Sugar (Sucrose) - Prepared according to the procedure of Formula 1, except with no glycerol.
Cinnamon Rolls

| Ingredient | Batch Size (wt %) | 15000 Grams (gr) |
|---|---|---|
| 1st Stage Ingredients | | |
| Flour - Hard, Malt, En | 52.88 | 7932.0 |
| NFDM - HI Heat | 2.00 | 300.0 |
| Ascorbic Acid | 0.0100 | 1.5 |
| Azodicarbonamide | 0.0220 | 3.3 |
| DATEM | 0.1600 | 24.0 |
| Sodium Stearoyl Lactylate | 0.2000 | 30.0 |
| Sugar (Sucrose) | 3.50 | 525.0 |
| Margarine/Shortening | 3.00 | 450.0 |
| Water | 25.73 | 3859.5 (2573.1 is H$_2$O, 1286.4 is Ice) |
| Fresh Eggs | 5.00 | 750.0 |
| Compressed Yeast | 3.00 | 450.0 |
| 2nd Stage Ingredients | | |
| Sugar (Sucrose) | 3.50 | 525.0 |
| Salt | 1.00 | 150.0 |
| Total: | 100.00 | 15000.3 |

Formula 4 - 5.5% Sucrose - Prepared according to the procedure of Formula 1, except with no glycerol.
Cinnamon Rolls

| Ingredient | Batch Size (wt %) | 15000 Grams (gr) |
|---|---|---|
| 1st Stage Ingredients | | |
| Flour - Hard, Malt, En | 53.43 | 8014.5 |
| NFDM - Hi Heat | 2.00 | 300.0 |
| Ascorbic Acid | 0.0100 | 1.5 |
| Azodicarbonamide | 0.0220 | 3.3 |
| DATEM | 0.1600 | 24.0 |
| Sodium Stearoyl Lactylate | 0.2000 | 30.0 |
| Sugar (Sucrose) | 2.75 | 412.5 |
| Margarine/Shortening | 3.00 | 450.0 |
| Water | 26.68 | 4002.0 (2668.1 is H$_2$O, 1333.9 is Ice) |
| Fresh Eggs | 5.00 | 750.0 |
| Compressed Yeast | 3.00 | 450.0 |
| 2nd Stage Ingredients | | |
| Sugar (Sucrose) | 2.75 | 412.5 |
| Salt | 1.00 | 150.0 |
| Total: | 100.00 | 15000.3 |

Formula 5 - 3.5% Sucrose - Prepared according to the procedure of Formula 4.
Cinnamon Rolls

| Ingredient | Batch Size (wt %) | 15000 Grams (gr) |
|---|---|---|
| 1st Stage Ingredients | | |
| Flour - Hard, Malt, En | 54.16 | 8124.0 |
| NFDM - Hi Heat | 2.00 | 300.0 |
| Ascorbic Acid | 0.0100 | 1.5 |
| Azodicarbonamide | 0.0220 | 3.3 |
| DATEM | 0.1600 | 24.0 |
| Sodium Stearoyl Lactylate | 0.2000 | 30.0 |
| Sugar | 1.75 | 262.5 |
| Margarine/Shortening | 3.00 | 450.0 |
| Water | 27.95 | 4192.5 (2795.1 is H$_2$O, 1397.4 is Ice) |
| Fresh Eggs | 5.00 | 750.0 |
| Compressed Yeast | 3.00 | 450.0 |
| 2nd Stage Ingredients | | |
| Sugar | 1.75 | 262.5 |
| Salt | 1.00 | 150.0 |
| Total: | 100.00 | 15000.3 |

Formula 6 - No Sucrose. Prepared like other Formulations except with no sucrose.
Cinnamon Rolls

| Ingredients | Batch Size (wt %) | 15000 Grams (gr) |
|---|---|---|
| 1st Stage Ingredients | | |
| Flour - Hard, Malt, En | 56.94 | 8541.0 |
| NFDM - Hi Heat | 2.00 | 300.0 |
| Ascorbic Acid | 0.0100 | 1.5 |
| Azodicarbonamide | 0.0220 | 3.3 |
| DATEM | 0.1600 | 24.0 |
| Sodiwn Stearoyl Lactylate | 0.2000 | 30.0 |
| Margarine/Shortening | 3.00 | 450.0 |
| Water | 28.67 | 4300.5 (2867.1 is H$_2$O, 1433.4 is Ice) |
| Fresh Eggs | 5.00 | 750.0 |
| Compressed Yeast | 3.00 | 450.0 |
| 2nd Stage Ingredients | | |
| Salt | 1.00 | 150.0 |
| Total: | 100.00 | 15000.3 |

Table 2 shows data from Formulas 1–6.

TABLE 2

| Formula ID | Onset of Freezing | Osmolality | Maximum grams ice (freezable water) per 100 gr dough | BSV |
|---|---|---|---|---|
| 6 | 22.2 F. | 1.54 | 20.9 | 3.0 |
| 5 | 20.8 | 2.35 | 19.6 | 2.9 |
| 4 | 18.9 | 2.93 | 16.1 | 3.7 |
| 3 | 16.1 | 3.41 | 14.1 | 3.5 |
| 2 | 10.8 | 4.56 | 11.6 | 3.2 |
| 1 | 5.1 | 5.93 | 8.7 | 2.5 |

FIG. 1 shows Baked Specific Volume of Formulas 1–6 versus FOT.

FIG. 2 shows BSV versus floor time (resting) for a dough composition of Formula 3.

FIG. 3 is four photographs of baked dough compositions of Formula 3, one composition (in FIGS. 3*c* and 3*d*) being rested for 20 minutes and the other not being rested. The photographs show larger bubbles in the rested baked dough composition.

FIG. 5 shows BSV versus freeze/thaw cycles of a dough composition of Formula 3.

Figure 6:
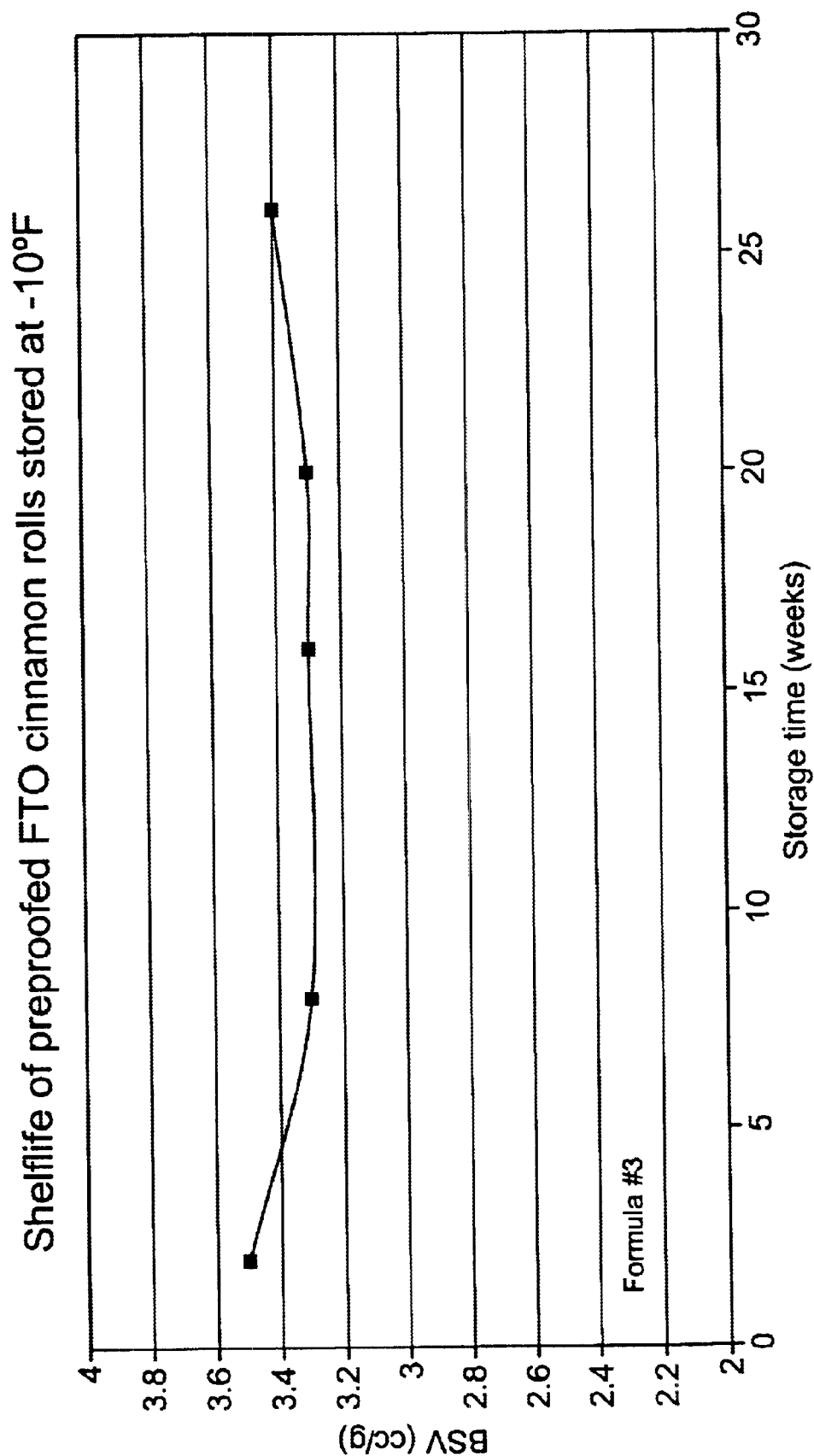
FIG. 6 illustrates a graph of baked specific volume versus frozen storage time.

FIG. 6 shows BSV versus storage time of a dough composition of Formula 3.

FIG. 7 shows FOT versus the calculated Osmolality.

What is claimed is:

1. A method of preparing a yeast-leavened, pre-proofed dough composition, the method comprising providing a dough composition comprising flour, yeast, water, and an amount of freezing point depressant that depresses a freezing onset temperature of the dough composition but that allows ice formation in the dough composition at a frozen storage temperature the freezing onset temperature of the dough composition being in the range from about 10 F. to about 20 F., resting the dough composition to allow bubbles in the dough composition to enlarge in size to provide a dough composition raw specific volume in the range from about 1.0 cc/g to about 1.2 cc/g, processing the dough composition by sheeting, proofing the dough composition, and storing the dough composition at a frozen storage temperature that allows ice to form in the dough composition, wherein the dough composition can be baked to have a relatively greater baked specific volume compared to the same baked dough composition prepared without the resting step, wherein the dough composition comprises from about 3 to about 8 parts by weight sucrose.

2. The method of claim 1 wherein the frozen storage temperature is in the range from about −20 F. to about 32 F.

3. The method of claim 1 wherein the frozen storage temperature is in the range from about −10 to about 10 F.

4. The method of claim 1 wherein the freezing onset temperature is in the range from about 15 F. to about 20 F.

5. The method of claim 1 wherein the freezing point depressant is chosen from the group consisting of a sugar, a salt, an alcohol, a polyol, and combinations thereof.

6. The method of claim 1 wherein the freezing point depressant is selected from the group consisting of sucrose, dextrose, fructose, ethanol, glycerine, sodium chloride salt, and combinations thereof.

7. The method of claim 1 wherein the dough composition comprises from about 2 to about 5 equivalents freezing point depressant per kilogram solvent water.

8. The method of claim 1 wherein the dough composition comprises from about 3 to about 8 parts by weight sucrose and from 0 to about 2 parts by weight ethanol.

9. The method of claim 1 wherein the dough composition does not contain vital wheat gluten or any other source of concentrated wheat gluten.

10. The method of claim 1 wherein the dough is mixed and then rested for a time in the range from about 10 to about 30 minutes and then further processed.

11. The method of claim 1 wherein during the proofing step the dough product is proofed to a raw specific volume in the range from about 1.5 to about 2.5 cubic centimeters per gram.

12. The method of claim 1 wherein the dough is baked in a conventional, convection, impingement, high intensity light, or microwave oven, or an oven that combines two or more modes of heating in one oven.

13. The method of claim 1 further comprising packaging the proofed dough composition in non-modified atmosphere packaging.

14. The method of claim 1 further comprising baking the dough composition without thawing.

15. The method of claim 14 wherein the dough composition is baked to a baked specific volume in the range from about 2.5 to at least about 4 cubic centimeters per gram.

16. The method of claim 1 wherein the dough is frozen for more than one week.

17. The method of claim 1 wherein the dough is frozen for more than about three months.

18. The method of claim 17 wherein the frozen dough composition is baked to a baked specific volume in the range from about 3 to at least about 4 cubic centimeters per gram.

19. The method of claim 1 wherein the dough composition includes freezing point depressant to provide a dough composition having a freezing onset temperature in the range from 10 to 20 F., the dough composition is packaged in non-modified atmosphere packaging, and wherein the dough composition can be baked from frozen without thawing or proofing to produce a baked dough composition having a relatively greater baked specific volume compared to a similar dough composition having an freezing onset temperature that is either below 10 F. or that is greater than 20 F.

20. The method of claim 19 wherein the packaged dough composition is stored at a frozen storage temperature in the range from about −10 F. to about 10 F.

21. The method of claim 1 wherein the dough composition includes freezing point depressant to provide a dough composition having a freezing onset temperature in the range from 10 to 20 F., and the dough composition is packaged in non-modified atmosphere packaging, wherein the dough composition can be baked from frozen without thawing or proofing to produce a baked dough composition having improved freeze-thaw stability compared to a similar dough composition having a freezing onset temperature either below 10 F. or that is greater than 20 F.

22. The method of claim 21 wherein the dough composition can be subjected to 5 freeze/thaw cycles and be baked to a baked specific volume that is greater than 3 cubic centimeters per gram.

23. The method of claim 21 wherein the dough composition can be subjected to 5 freeze/thaw cycles and be baked to a baked specific volume that is within 5 percent of the baked specific volume of an identical dough composition subjected to no freeze/thaw cycles.

24. A method of preparing a yeast-leavened, pre-proofed dough composition, the method comprising:

mixing ingredients into a dough composition comprising flour, yeast, water, and an amount of freezing point depressant that reduces the amount of ice formed during frozen storage but that still results in some ice formation at a frozen storage temperature and the freezing onset temperature of the dough composition is in the range from about 10 F. to about 20 F., resting the dough composition for at least five minutes to allow bubbles in the dough composition to enlarge in size to provide a dough composition raw specific volume in the range from about 1.0 cc/g to about 1.2 cc/g, and processing the dough composition after resting by sheeting, proofing the dough composition, packaging the proofed dough composition using non-modified atmosphere packaging, storing the proofed dough composition at a frozen storage temperature that allows ice to form in the dough composition, and baking the dough composition without proofing or thawing the dough composition between frozen storage and baking, wherein the dough composition comprises from 5 to 10 weight percent sweetener.

25. The method of claim 24 wherein the baked dough composition has a relatively greater baked specific volume compared to the same dough composition prepared without the resting step.

26. The method of claim 24 wherein the dough composition comprises from about 3 to about 8 parts by weight sucrose and from 0 to about 2 parts by weight ethanol.

27. The method of claim 24 wherein the dough composition has a freezing onset temperature in the range from about 15 F. to about 20 F.

28. The method of claim 24 wherein the pre-proofed dough composition is packaged in non-modified atmosphere packaging, and the pre-proofed dough composition can be baked from frozen without thawing or proofing to produce a baked dough composition having a baked specific volume of at least about 2.5 g/cc.

29. The method of claim 1 having a freezing onset temperature in the range from about 15 F. to about 20 F.

30. The method of claim 1 wherein the dough composition is frozen.

31. The method of claim 1 wherein the dough composition does not contain hydrophilic colloid.

32. The method of claim 24 wherein the dough composition does not contain hydrophilic colloid.

33. The method of claim 26 wherein the dough composition does not contain hydrophilic colloid.

34. The method of claim 24 wherein the dough can be baked from frozen without thawing or proofing to a baked dough composition having a baked specific volume of from about 2.5 cc/g to about 4 cc/g.

35. The method of claim 24 wherein the dough can be baked from frozen without thawing or proofing to a baked dough composition having a baked specific volume of from about 3 cc/g to about 4 cc/g.

36. The method of claim 1 wherein the dough composition is a cinnamon roll.

* * * * *